June 2, 1931.                O. KRELL ET AL                  1,808,558
                              ELECTRIC ARC LAMP
                            Filed Aug. 17, 1927              3 Sheets-Sheet 1
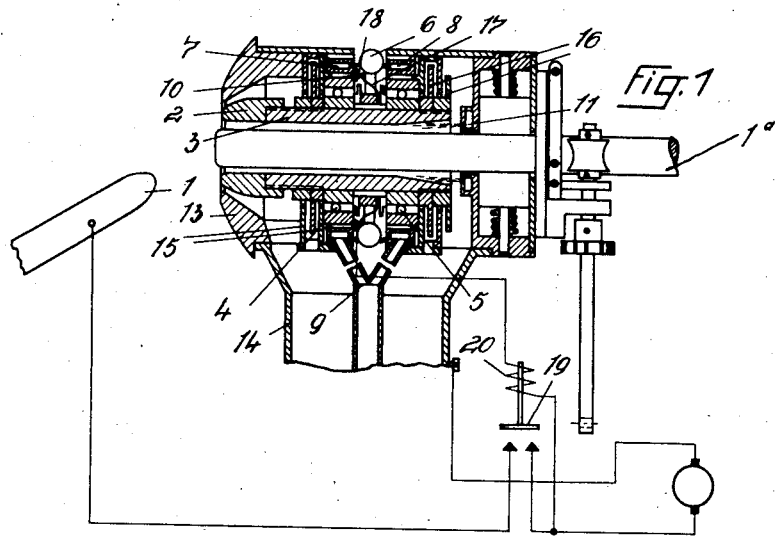

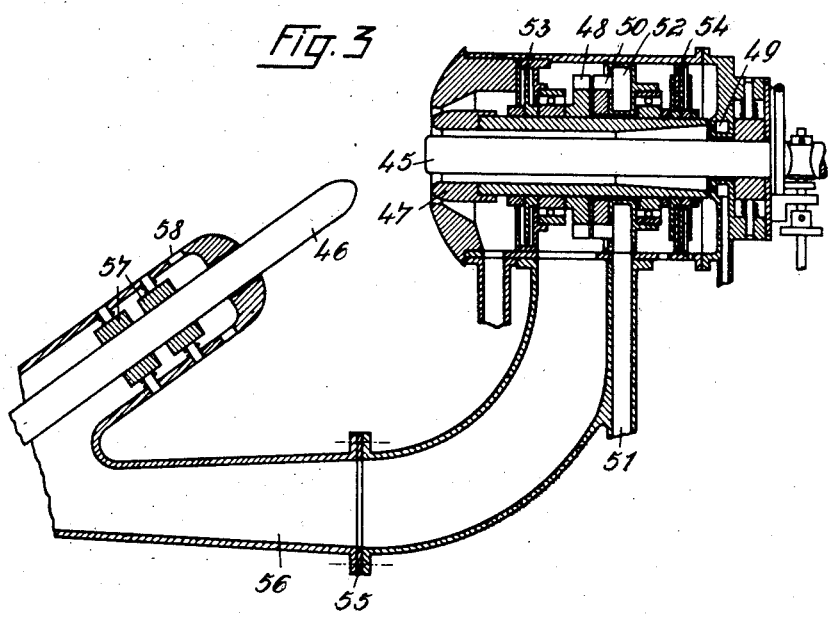
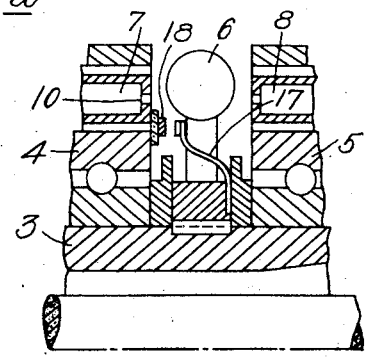

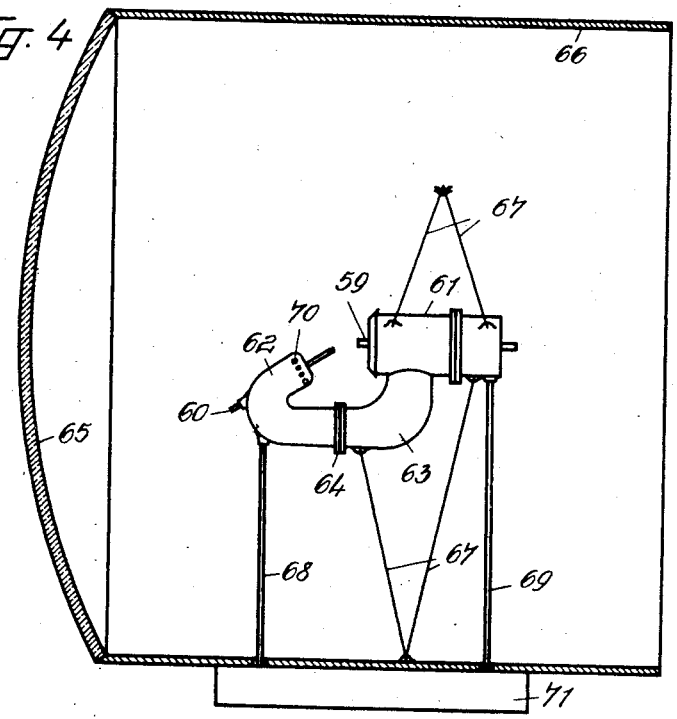
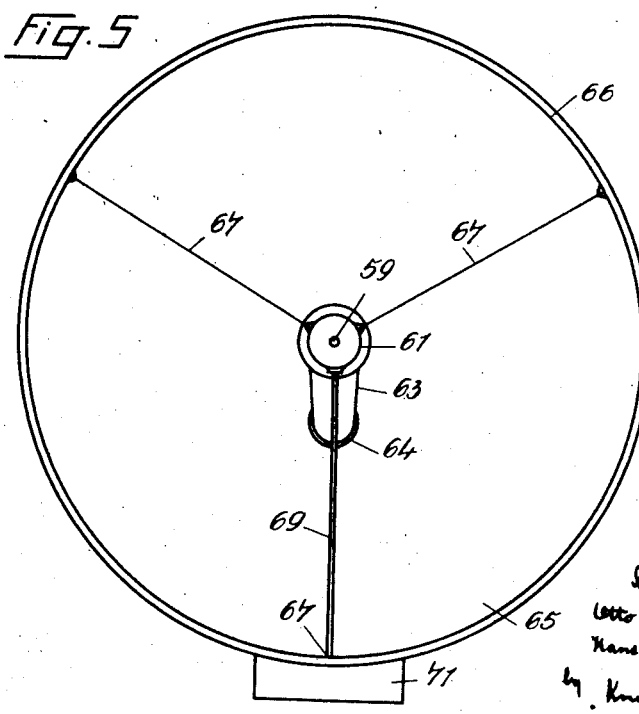

Patented June 2, 1931

1,808,558

UNITED STATES PATENT OFFICE

OTTO KRELL, OF BERLIN-DAHLEM, AND HANS GERDIEN, OF BERLIN-GRUNEWALD, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

ELECTRIC ARC LAMP

Application filed August 17, 1927, Serial No. 213,602, and in Germany July 6, 1926.

Our invention relates to electric arc lamps.

In order to attain high specific brilliancy in electric arc lamps it has already been proposed to surround the positive electrode by a liquid-cooled revolving tube. The liquid, for instance water, is usually supplied to the tube axially and owing to the high rotary speed of the tube thrown towards the outside, so that the interior and the end of the outer tube are covered with a continuous film of liquid.

According to our invention the revolving tube is disposed coaxially with the rotor of a motor. The rotor may then be directly coupled with the revolving tube and sensitive driving members eliminated. The rotor of the driving motor is preferably provided with a bore through which the electrode is introduced.

A number of embodiments of our invention are illustrated in the drawings affixed hereto and forming part of our specification.

In the drawings:

Fig. 1 illustrates a longitudinal section through an electric arc lamp in which the tube serving for limiting the contact area of the arc on the positive electrode, is driven by an air turbine, Fig. 1ª represents an enlarged sectional view of the central upper portion of Fig. 1, Fig. 2 represents a longitudinal section through an arc lamp in which the tube is driven by an electric motor, Fig. 3 a similar section through an arc lamp in which the negative electrode is also cooled, Fig. 4 a partly sectional plan view of a searchlight in which the electrode-holder is secured by guy wires, and Fig. 5 an end view of the searchlight.

Referring to Fig. 1 of the drawings which shows an electric arc lamp in which the tube serving for confining the base of the arc is driven by an air turbine. 1 is the negative electrode, 2 the protective tube which contains the positive electrode 1ª, and which is enamelled on its surface to prevent a flashover of the arc. The tube 2 is screwed on to a tubular shaft 3 journaled in the ball-bearings 4 and 5. Between these bearings is located the propeller wheel 6. 7 and 8 are hollow rings provided with bores at the sides facing the propeller wheel. Through the pipes 9 compressed air is supplied to the rings 7 and 8 which issues through the bores 10 of the rings and sets the propeller wheel in rotation. 11 is a hollow ring provided with lateral bores and supplied with water by a pipe not shown in Fig. 1, but arranged similar to the manner in which liquid is supplied through pipe 30 to distributor 29 in Fig. 2. The water issues through the bores and is squirted into the interior of the tubular shaft 3. The injected water enters the tube 2 at the opposite end of the tubular shaft 3 and is thrown towards the outside owing to the high rotary speed of the ring, caught by the refractory ring 13, consisting of graphite, for instance, and hence flows into the interior of the standard 14 of the lamp. To prevent the water from entering the interior of the driving mechanism splash-rings 15 and 16 are provided. Instead of using compressed air for driving the turbine steam, compressed gas or water may be employed. When using steam or water a protective cap for discharging the driving medium issuing from the turbine must be provided.

To prevent damage to the tube in case of failure of the driving mechanism which would interrupt rinsing and cooling of tube 2 with water, a device is provided by means of which the supply of current to the electrodes or the switching on of the current is prevented, when the speed of the tube 2 falls below a certain value or the tube stops altogether. With this end in view one or a plurality of springs 17 are fixed upon the propeller wheel 6 and loaded with weights at their ends. In the position of rest of the wheel 6 these springs abut against the insulated ring 18. When the blade wheel 6 has attained a sufficiently high speed the springs are raised off the ring 18 owing to the centrifugal force set up and the electric connection with the insulated ring 18 is interrupted. To render the switching on of the current impossible when the tube 2 has come to rest the switch 19 is connected in the feeders to the electrodes. The switch lever of the contacting device is under the control of the electro-magnet 20, the winding of which receives current through the standard or casing 14 the ball-bearings, the spring 17 and the insulated ring 18 as soon as the springs make contact with the insulated ring when the speed of the tubes 2 or 3 falls below a certain value. The switch lever is then pulled upwards and the supply of current interrupted. The supply of current to the lamp remains interrupted until the tube 2 and the tubular shaft 3 have attained a sufficient speed.

Fig. 2 of the drawings illustrates a further embodiment of our invention in which the revolving tube is driven by an electric motor. 21 is a carbon electrode, 22 a revolving enamelled tube screwed to the hollow shaft 23 and serving for limiting the contact area of the arc on electrode 21. The hollow shaft 23 carries the rotor 24 of an electric motor the field system 25 of which is housed in the casing 26. The hollow shaft 23 is journaled in the ball-bearings 27 and 28. 29 is a hollow ring supplied with water through the pipe 30 which is projected through the bores 31 into the interior of the tubular shaft 23. It traverses the hollow shaft and issues at the end of the electrode 21, is here thrown towards the outside, caught by the highly refractory ring 32 and discharged by the pipe 33. In order to lead the water supplied at the right-hand end of the hollow shaft 23 safely to the left-hand end, the hollow shaft may at its inside be provided with helically wound grooves indicated by a dashed line. 34 and 35 are splash rings which prevent the penetration of water into the interior of the motor. 36 are contact members which electrically connect the electrode 31 with the housing. 37 is a feed device of any suitable design.

The electric motor is preferably designed as series-wound motor so that it may develop a high starting torque and be able to overcome mechanical resistance. In order to interrupt the supply of current to the electrodes 21 and 39 when the motor 38 is at rest, a relay is preferably employed, which interrupts the supply if the current supplied to the motor exceeds or remains below a certain value. For this purpose the relay 40 is connected in the circuit of the motor 38 and closes the contacts 41 or 42 when the current in the circuit deviates form a predetermined value. The winding 43 is then energized and lifts the switch member 44 off its contacts and thus interrupts the supply to the electrodes.

Instead of designing the motor 38 as series-wound motor, it may sometimes be preferable to use a compound-wound motor. In this way the maximum speed of the motor may easily be limited by means of the shunt winding and the motor may yet develop a high starting torque.

If alternating current is available for feeding the arc lamp which is then preferably first converted into direct current for feeding the electrodes, it may be advantageous to design the motor 38 as a squirrel-cage rotor motor. In this way the service is rendered more reliable, since the commutator, the slip-rings and the like are eliminated and the armature may be made resistive to high temperatures. The stationary coil may easily be sufficiently cooled.

In certain cases the electric motor 38 may also serve for conveying the cooling liquid supplied to the tube 22. For this purpose a small centrifugal pump may be mounted on the hollow shaft 23 or a pumping device be coupled with the hollow shaft.

In order to avoid an impermissible heating of the negative electrode at high loads on the arc lamp, the negative electrode is also cooled according to another feature of our invention. If a turbine is used to drive the liquid-cooled tube surrounding the positive electrode, the driving medium discharged from the turbine may suitably be used for cooling the negative electrode or its holder.

Fig. 3 of the drawings illustrates an embodiment of our invention of this nature. Referring to this figure 45 is the positive electrode and 46 the negative electrode. 47 is a liquid-cooled tube upon which is mounted the turbine runner 48. Through the nozzle ring 49 water is introduced into the interior of the tube 47. 50 is a ring of buckets to which is supplied the driving medium, such as compressed air, compressed gas or steam through the pipe 51 and the hollow ring 52. 53 and 54 are labyrinth packings, which on the one hand prevent the penetration of water into the turbine and on the other hand the leakage of any considerable quantities of the driving medium from the turbine. The driving medium escaping from the turbine is fed to the holder of the negative carbon through the hollow arm 56 electrically separated by insulation at any suitable place, for instance at 55. 57 are structural elements serving for the supply of current to the electrode 46. They are preferably arranged in the shape of a spider, if desired perforated, so that the cooling medium is able to sweep along in the direction of the arc. 58 are openings through which the cooling medium passes into the atmosphere. Instead of these openings a special discharge conduit may be provided to prevent with absolute certainty the arc from being interfered with by the draft of air. Should the quantity of driving medium necessary for operating the turbine be greater than the quantity which can be discharged through the holder of the negative carbon, a special opening may be provided in the hollow arm 56, the size of which is preferably adjustable.

The mounting of the electrode holder in front of the projector of the searchlight is preferably effected by the aid of guy wires which pass from the electrode holder to the housing of the searchlight in the form of a spider at angles of substantially 120°. The drive of the electrodes may be effected by thin shafts or spindles located in a plane with the guy members.

The electrode holder is preferably mounted within the searchlight in such a manner, that when the light cone is directed horizontally the connecting arm 56 between the positive and the negative electrode holder lies horizontally or substantially so. Such an arrangement has the advantage that the arm 56 is not located above the arc in any position of the searchlight.

Figures 4 and 5 illustrate a searchlight in which the electrode holders are held by guy wires. Fig. 4 shows the plan and Fig. 5 the end view of the arrangement.

Referring to these figures 59 is the positive carbon, 60 the negative, 61 the positive carbon holder, and 62 the holder for the negative carbon. Both carbon holders are connected with each other by the arm 63, which is split at 64, the halves being electrically insulated from each other. 65 is the projector or mirror, 66 the housing of the searchlight and 67 are guy wires from which the electrode holder is suspended. By exerting a sufficient pull upon the wires a sufficiently secure position of the electrodes may be attained, particularly if yielding members are inserted in the wires which maintain the necessary tension in these members even when these members vary in length owing to temperature fluctuations. 68 and 69 are shafts or spindles for feeding the carbons. 71 contains the regulating device for the carbons. If the positive carbon is surrounded by a liquid-cooled tube which is driven by a gas or air turbine, the arm 63 may be made hollow and the driving medium escaping from the turbine may be used for cooling the holder of the negative electrode. This holder is then preferably provided with openings 70 through which the cooling agent escapes into the atmosphere.

Various modifications and changes may be made without departing from the spirit and the scope of the invention;

We claim as our invention:

1. In an arc lamp in combination two electrodes and holders therefor, circuits for connecting said electrodes to a current source, a motor, a tube spaced around the positive electrode and being directly coupled with said motor, and means for supplying cooling liquid into the space between said positive electrode and said tube.

2. In an arc lamp in combination two electrodes and holders therefor, circuits for connecting said electrodes to a current source, a motor, a tube spaced around the positive electrode and forming the rotor shaft for said motor, and means for supplying cooling liquid into the space between said positive electrode and said tube.

3. In an arc lamp in combination two electrodes and holders therefor, circuits for connecting said electrodes to a current source, a motor, a tube spaced around the positive electrode and being directly coupled with said motor, and means for supplying cooling liquid into the space between said positive electrode and said tube, and means for also cooling the negative electrode.

4. In an arc lamp in combination two electrodes and holders therefor, means for connecting said electrodes to a current source, a turbine, a tube spaced around the positive electrode and being directly coupled with said turbine, means for supplying cooling liquid into the space between said positive electrode and said tube, and means for supplying an operating medium to said turbine.

5. In an arc lamp in combination two electrodes and holders therefor, means for connecting said electrodes to a current source, a turbine, a tube spaced around the positive electrode and being directly coupled with said turbine, means for supplying cooling liquid into the space between said positive electrode and said tube, means for supplying an operating medium to said turbine, and means for conducting the operating medium discharged from said turbine to the negative electrode for cooling said electrode.

6. In an arc lamp in combination two electrodes and holders therefor, circuits for connecting said electrodes to a current source, a motor, a tube spaced around the positive electrode and being directly coupled with said motor, and means for supplying cooling liquid into the space between said positive electrode and said tube, an arm connecting said electrode holders, guy elements for holding said electrode holder in place and yielding elements inserted in said guy elements for compensating the expansion and contraction of said guy elements due to variations in temperature.

7. In an arc lamp in combination two electrodes and holders therefor, means for connecting said electrodes to a current source, a turbine, a tube spaced around the positive electrode and being directly coupled with said turbine, means for supplying cooling liquid into the space between said positive electrode and said tube, means for supplying an operating medium to said turbine, a hollow arm for connecting the two electrode holders together and being adapted to conduct the operating medium discharged by said turbine to the negative electrode holder for cooling the negative electrode.

8. In an arc lamp in combination two electrodes and holders therefor, circuits for connecting said electrodes to a current source, a motor, a tube spaced around the positive electrode and being directly coupled with said motor, and means for supplying cooling liquid into the space between said positive electrode and said tube, a cut-out switch in the circuits including said electrodes and control means for said switch responsive to the speed of said rotating tube for interrupting the current supply to said electrodes when the speed of the tube drops below a desired permissible limit.

9. In an arc lamp in combination two electrodes and holders therefor, circuits for connecting said electrodes to a current source, a motor, a tube spaced around the positive electrode and being directly coupled with said motor, means for guiding cooling liquid into the space between said positive electrode and said tube and means operated by said motor for supplying the cooling liquid to said guiding means.

In testimony whereof we affix our signatures.

OTTO KRELL.
HANS GERDIEN.